United States Patent
Wakabayashi

(10) Patent No.: US 11,448,945 B2
(45) Date of Patent: Sep. 20, 2022

(54) OPTICAL PATH SHIFTING DEVICE AND IMAGE DISPLAY DEVICE

(71) Applicant: SEIKO EPSON CORPORATION, Tokyo (JP)

(72) Inventor: Shinichi Wakabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 16/683,607

(22) Filed: Nov. 14, 2019

(65) Prior Publication Data

US 2020/0159094 A1  May 21, 2020

(30) Foreign Application Priority Data

Nov. 15, 2018 (JP) .............................. JP2018-214424

(51) Int. Cl.
  *G03B 21/14* (2006.01)
  *H02K 11/215* (2016.01)
  *H02K 11/25* (2016.01)
  *H02K 41/03* (2006.01)
  *G03B 21/00* (2006.01)

(52) U.S. Cl.
  CPC ......... *G03B 21/142* (2013.01); *H02K 11/215* (2016.01); *H02K 11/25* (2016.01); *H02K 41/031* (2013.01); *G03B 21/006* (2013.01)

(58) Field of Classification Search
  CPC ...... G03B 21/00; G03B 21/14; G03B 21/142; G03B 21/006; H02K 11/215; H02K 11/25; H02K 41/031
  USPC ......................................................... 353/46
  See application file for complete search history.

(56) References Cited

U.S. PATENT DOCUMENTS

| | | | |
|---|---|---|---|
| 2009/0184775 A1 | 7/2009 | Komori et al. | |
| 2015/0264291 A1 | 9/2015 | Tani et al. | |
| 2015/0277104 A1 | 10/2015 | Hino | |
| 2016/0124216 A1 | 5/2016 | Kojima et al. | |
| 2016/0227176 A1 | 8/2016 | Mizoguchi | |
| 2020/0159093 A1* | 5/2020 | Wakabayashi | G03B 21/142 |
| 2020/0174246 A1* | 6/2020 | Wakabayashi | G02B 26/08 |
| 2020/0363707 A1* | 11/2020 | Hirakura | G03B 21/142 |
| 2020/0371405 A1* | 11/2020 | Yanagihara | H04N 9/3188 |

FOREIGN PATENT DOCUMENTS

| | | |
|---|---|---|
| JP | 4503076 B2 | 7/2010 |
| JP | 2015-187678 A | 10/2015 |
| JP | 2015-194721 A | 11/2015 |

(Continued)

*Primary Examiner* — William C. Dowling
(74) *Attorney, Agent, or Firm* — Dority & Manning, P.A.

(57) ABSTRACT

An optical path shifting device includes: a holding frame holding a rectangular glass plate; a support part supporting the holding frame in a swingable state; and an actuator causing the holding frame to swing. The holding frame has a first shaft part at a position opposed to a first corner part of the glass plate, and a second shaft part at a position opposed to a second corner part situated in a diagonal direction from the first corner part. The holding frame is connected to the support part by the first and the second shaft parts. The actuator is arranged at a position opposed to a third corner part and has a permanent magnet and a coil opposed to each other. A first opposing surface of the permanent magnet and a second opposing surface of the coil are arranged in a direction intersecting a surface of the glass plate.

10 Claims, 8 Drawing Sheets

(56) References Cited

FOREIGN PATENT DOCUMENTS

| | | |
|---|---|---|
| JP | 2016-090752 A | 5/2016 |
| JP | 2016-142863 A | 8/2016 |
| JP | 2016-180832 A | 10/2016 |
| WO | 2016/124253 A1 | 8/2016 |
| WO | 2016/124782 A1 | 8/2016 |
| WO | 2018/019831 A1 | 2/2018 |

* cited by examiner

OPTICAL PATH SHIFTING DEVICE AND IMAGE DISPLAY DEVICE

The present application is based on, and claims priority from JP Application Serial Number 2018-214424, filed Nov. 15, 2018, the disclosure of which is hereby incorporated by reference herein in its entirety.

BACKGROUND

1. Technical Field

The present disclosure relates to an optical path shifting device and an image display device.

2. Related Art

JP-A-2016-142863 discloses an image display device having an optical path shifting device which shifts the optical path of image light emitted from a light modulation device such as a liquid crystal panel. The image display device of JP-A-2016-142863 uses the optical path shifting device in order to make the resolution of a projected image higher than the resolution of the light modulation device. The optical path shifting device or optical device of JP-A-2016-142863 has a glass plate, a moving part having a holding member holding the glass plate, a support part supporting the moving part, a pair of shaft parts coupling the moving part and the support part together, and a drive mechanism causing the moving part to swing. The optical path shifting device of JP-A-2016-142863 causes the holding member to swing about a swing axis passing through the pair of shaft parts and thus changes the attitude of the glass plate. Thus, the optical path shifting device can refract the image light incident on the glass plate and shift the optical path.

The optical path shifting device of JP-A-2016-142863 uses a vibration actuator having a coil and a permanent magnet, as the drive mechanism causing the moving part to swing. The vibration actuator has a permanent magnet fixed to an edge of a frame-like holding member, and a pair of coils opposed to the permanent magnet from both sides in a normal direction to the glass plate. The permanent magnet and the coils are arranged at a distance such that the permanent magnet and the coils do not collide with each other when the moving part swings. The vibration actuator is arranged at two positions sandwiching the moving part. Each vibration actuator applies an alternating voltage to the pair of coils, thus causes a magnetic field generated by the coils to move the permanent magnet, and causes the moving part to swing.

The optical path shifting device causing the glass plate to swing and thus shifting the optical path is incorporated in an image display device or the like for use and therefore needs to be reduced in size and thickness. Therefore, the optical path shifting device having the vibration actuator with the coil and the permanent magnet opposed to each other similarly needs to be further reduced in size and thickness while maintaining a necessary drive force.

SUMMARY

An optical path shifting device according to an aspect of the present disclosure includes: an optical member having a shape of a rectangular plate and on which incident light is incident; a holding frame holding the optical member; a support part supporting the holding frame in a swingable state; and an actuator causing the holding frame to swing. The optical member has a first corner part and a second corner part opposite each other, and a third corner part and a fourth corner part opposite each other in a direction intersecting a diagonal line connecting the first corner part and the second corner part. The holding frame has a first shaft part provided at a position opposed to the first corner part, and a second shaft part provided at a position opposed to the second corner part. The holding frame is connected to the support part by the first shaft part and the second shaft part. The actuator is arranged at a position opposed to the third corner part.

An image display device according to another aspect of the present disclosure includes the foregoing optical path shifting device arranged in an optical path of image light. The actuator is driven to change the optical path of the image light.

DESCRIPTION OF EXEMPLARY EMBODIMENTS

An illustrative embodiment of the present disclosure will now be described with reference to the drawings. In this specification, for the sake of convenience of the description, an X-axis, a Y-axis, and a Z-axis are shown as three axes orthogonal to each other. One direction along the X-axis is defined as a +X direction, and the other direction is defined as a −X direction. One direction along the Y-axis is defined as a +Y direction, and other direction is defined as a −Y direction. One direction along the Z-axis is defined as a +Z direction, and the other direction is defined as a −Z direction.

Projector (Image Display Device)

Figure 1:
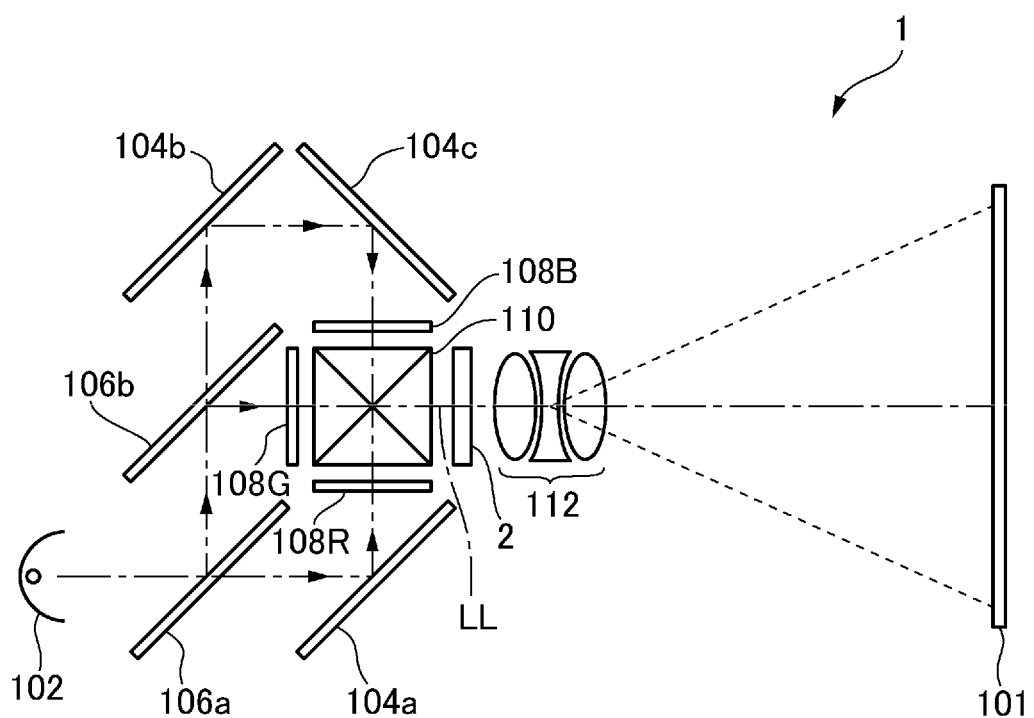
FIG. 1 is an explanatory view showing the optical configuration of a projector, which is an example of an image display device according to an embodiment.

FIG. 1 is an explanatory view showing an optical configuration of a projector, which is an example of an image display device according to this embodiment. A projector 1 shown in FIG. 1 is an LCD projector. The projector 1 is a device which displays an image on a screen 101, based on an image signal inputted from outside. The projector 1 has a light source 102, mirrors 104*a*, 104*b*, 104*c*, dichroic mirrors 106*a*, 106*b*, liquid crystal display elements 108R, 108G, 108B, a dichroic prism 110, an optical path shifting device 2, and a projection system 112.

The light source 102 is, for example, a halogen lamp, mercury lamp, light-emitting diode (LED), laser light source, and the like. Also, a light source that emits white light is used as the light source 102. The light emitted from the light source 102 is separated into red light (R) and the other light, for example, by the dichroic mirror 106a. The red light is reflected by the mirror 104a and subsequently becomes incident on the liquid crystal display element 108R. The other light is further separated into greed light (G) and blue light (B) by the dichroic mirror 106b. The green light is incident on the liquid crystal display element 108G. The blue light is reflected by the mirrors 104b, 104c and subsequently becomes incident on the liquid crystal display element 108B.

Each of the liquid crystal display elements 108R, 108G, 108B is used as a spatial light modulator. The liquid crystal display elements 108R, 108G, 108B are transmission-type spatial light modulators corresponding to the primary colors of R, G, and B, respectively, and have pixels arranged, for example, in the form of a matrix with 1080 pixels in height by 1920 pixels in width. At each pixel, the amount of light of transmitted light in comparison with the incident light is adjusted. In each of the liquid crystal display elements 108R, 108G, 108B, the distribution of the amount of light over all the pixels is controlled in a coordinated manner. The light spatially modulated by the liquid crystal display elements 108R, 108G, 108B is combined together by the dichroic prism 110. Thus, full-color image light LL is emitted from the dichroic prism 110. The emitted image light LL is enlarged and projected onto the screen 101 by the projection system 112.

The optical path shifting device 2 is arranged between the dichroic prism 110 and the projection system 112. The projector 1 shifts the optical path of the image light LL by the optical path shifting device 2, that is, performs so-called "pixel shifting", and thus displays an image with a higher resolution than the resolution of the liquid crystal display elements 108R, 108G, 108B, onto the screen 101. For example, when the liquid crystal display elements 108R, 108G, 108B are of full high definition, the projector 1 displays a 4K image.

Figure 2:
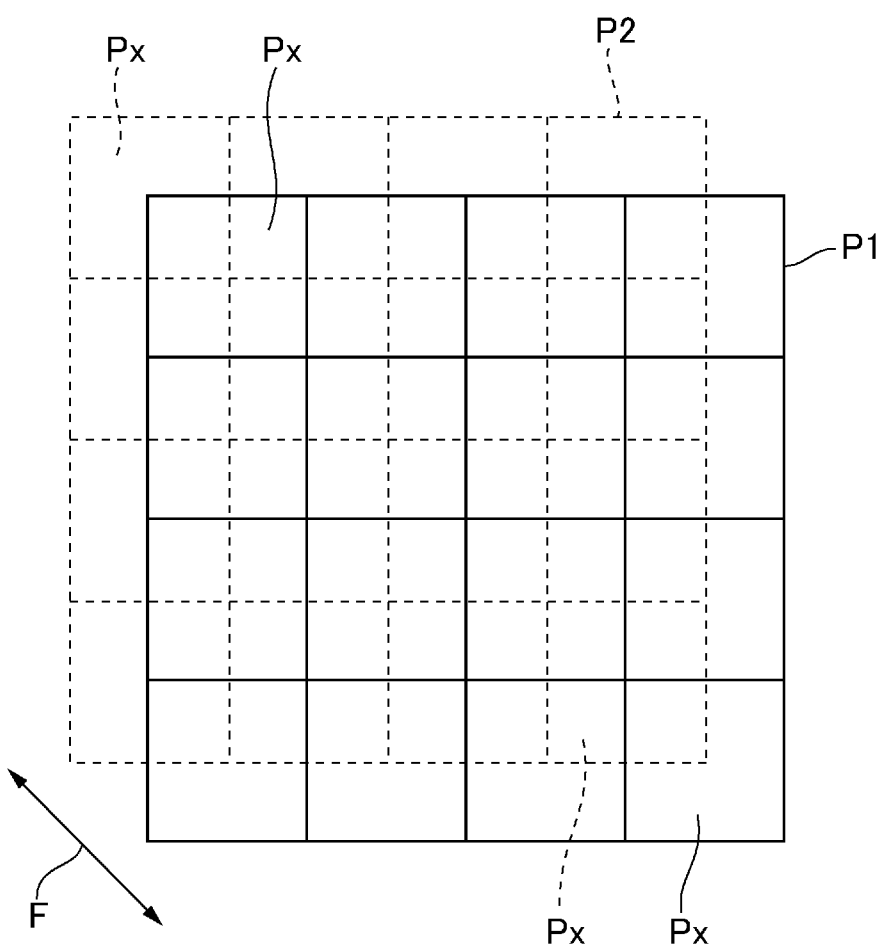
FIG. 2 is an explanatory view showing a shift in an image display position by shifting the optical path of image light.

The principle of resolution enhancement by shifting the optical path will now be briefly described with reference to FIG. 2. FIG. 2 is an explanatory view showing a shift in the image display position by shifting the optical path of image light. As will be described later, the optical path shifting device 2 has a glass plate 30, which is a light-transmissive substrate transmitting the image light LL. The optical path shifting device 2 changes the attitude of the glass plate 30 and thus shifts the optical path of the image light LL, using refraction. Using such shifting of the optical path, the projector 1 displays an image alternately at an image display position P1 resulting from shifting the optical path of the image light LL to one side and at an image display position P2 resulting from shifting the optical path of the image light LL to the other side. The image display positions P1, P2 are positions shifted by half a pixel in a diagonal direction F of a pixel Px on the screen 101, that is, by half the pixel Px. Such pixel shifting increases apparent pixels and thus enables resolution enhancement of the image projected on the screen 101. The amount of shift of the image display positions P1, P2 is not limited to half a pixel and may be, for example, ¼ or ¾ of the pixel Px.

Figure 3:
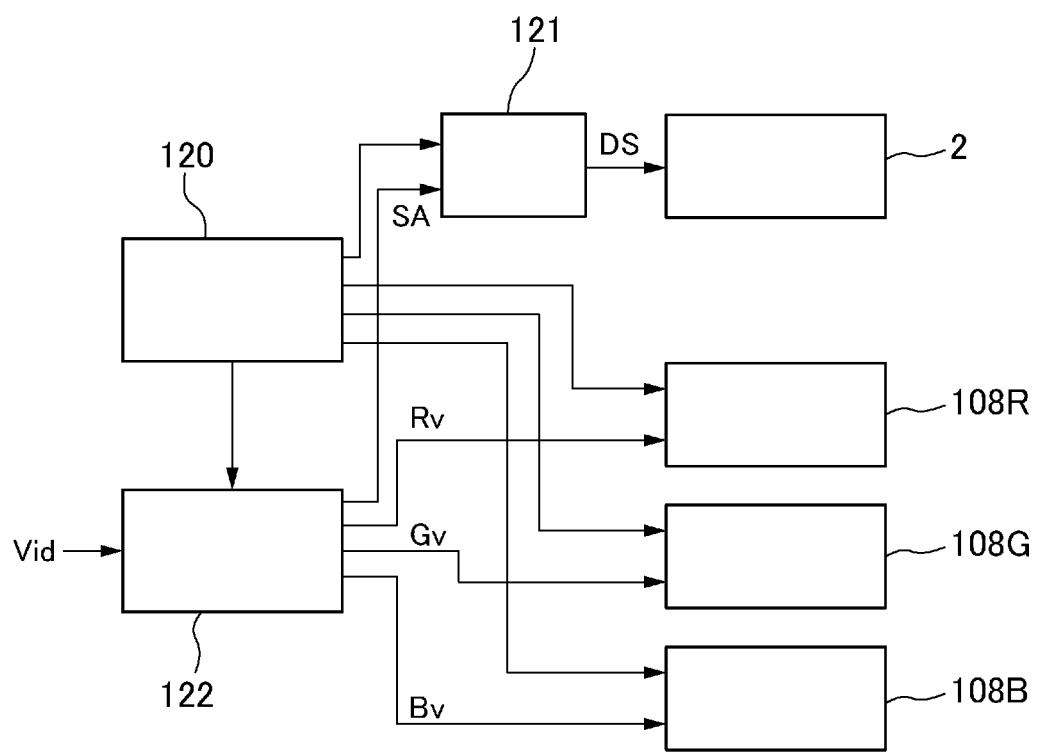
FIG. 3 is a block diagram showing the electrical configuration of the projector in FIG. 1.

FIG. 3 is a block diagram showing the electrical configuration of the projector 1 in FIG. 1. The projector 1 has a control circuit 120, a drive signal processing circuit 121, and an image signal processing circuit 122. The control circuit 120 controls a data signal writing operation to the liquid crystal display elements 108R, 108G, 108B, an optical path shifting operation in the optical path shifting device 2, and a data signal generation operation in the image signal processing circuit 122, or the like. The drive signal processing circuit 121 supplies a drive signal DS to drive the optical path shifting device 2, based on a synchronization signal SA outputted from the image signal processing circuit 122.

The image signal processing circuit 122 separates an image signal Vid supplied from an external device, not illustrated, into the primary colors of R, G, B, and converts the image signal Vid into data signals Rv, Gv, By suitable for the operation of the respective liquid crystal display elements 108R, 108G, 108B. The converted data signals Rv, Gv, By are supplied to the liquid crystal display elements 108R, 108G, 108B, respectively. The liquid crystal display elements 108R, 108G, 108B operate, based on the data signals Rv, Gv, By.

Optical Path Shifting Device

Figure 4:
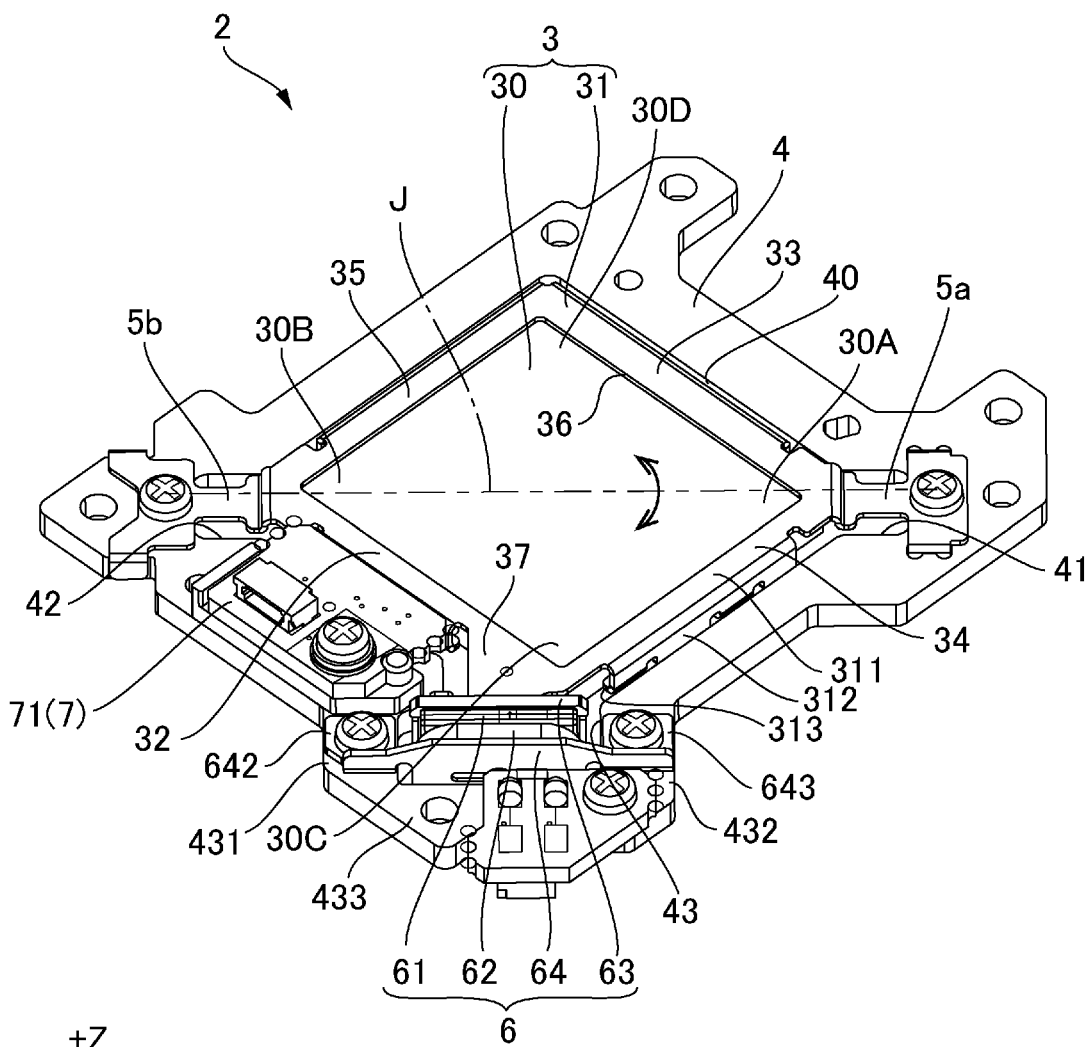
FIG. 4 is a perspective view of an optical path shifting device according to the embodiment.
Figure 4:
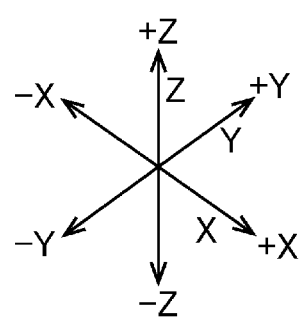
Figure 5:
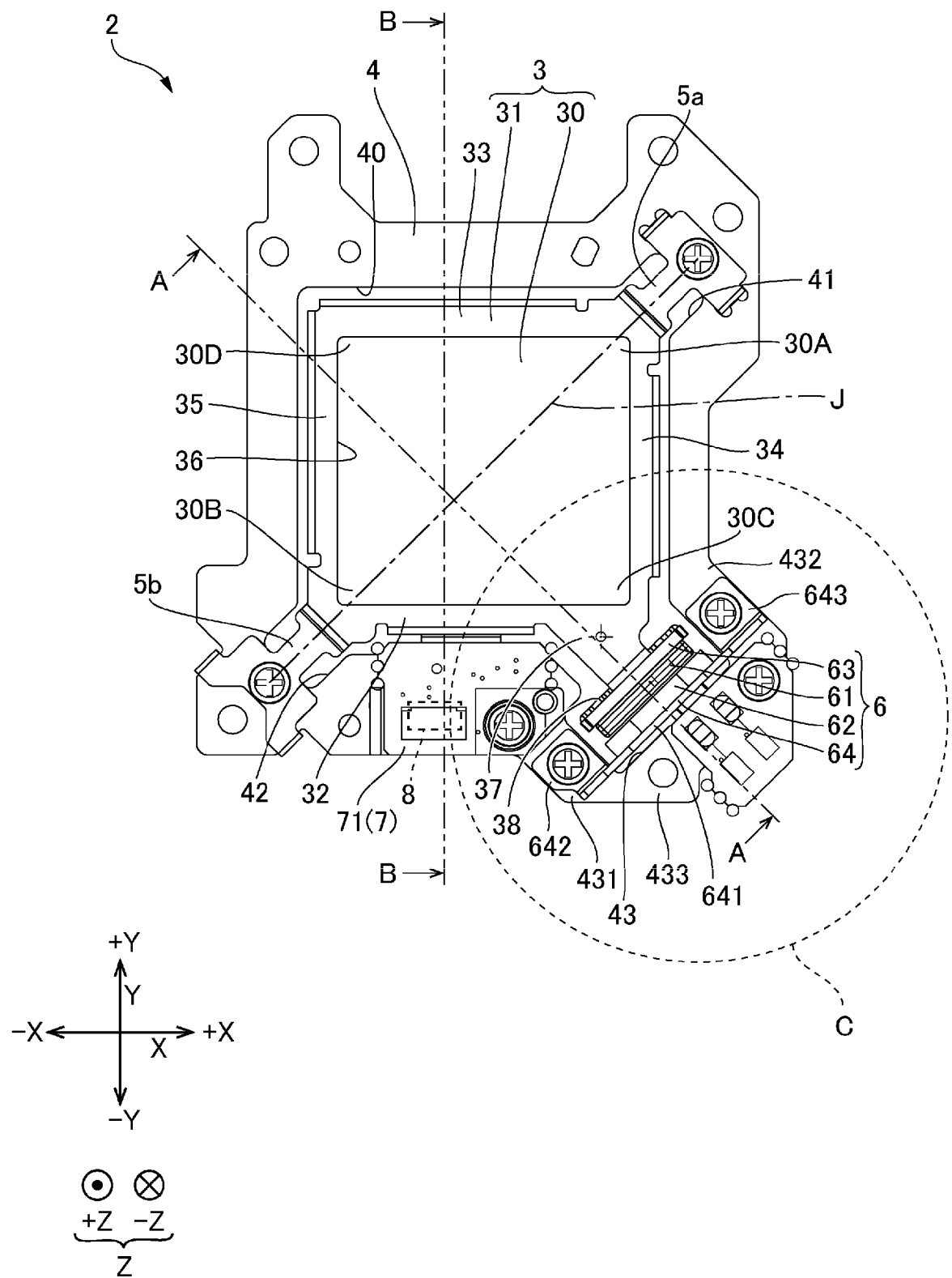
FIG. 5 is a plan view of the optical path shifting device in FIG. 4.

FIG. 4 is a perspective view of the optical path shifting device 2 according to the embodiment. The optical path shifting device 2 is used to shift the optical path of the image light LL in the projector 1 in FIG. 1. FIG. 5 is a plan view of the optical path shifting device 2 in FIG. 4. The optical path shifting device 2 has a rectangular moving part 3, a frame-like support part 4 surrounding the moving part 3, a first shaft part 5a and a second shaft part 5b coupling the moving part 3 and the support part 4 together, an actuator 6 causing the moving part 3 to swing about a swing axis J passing through the first shaft part 5a and the second shaft part 5b, a magnetic sensor 7 detecting the position of the moving part 3, and a thermistor 8 detecting the temperature of the magnetic sensor 7, shown in FIGS. 5 and 7.

The moving part 3 has the glass plate 30 as an optical member which is light-transmissive and on which the image light LL is incident, and a holding frame 31 holding the glass plate 30. When the moving part 3 is in a position where the angle of incidence of the image light LL to the glass plate 30 is 0°, which is hereinafter referred to as a reference position, the normal direction to the glass plate 30 coincides with the Z-axis. The optical path shifting device 2 is arranged in the projector 1, for example, in such a way that the +Z side of the optical path shifting device 2 faces the dichroic prism 110 and that the −Z side faces the projection system 112. The direction of the optical path shifting device 2 along the Z-axis may be the opposite of this.

The holding frame 31 is a rectangular frame-like member having a first frame part 32 and a second frame part 33 extending substantially parallel to the X-axis and a third frame part 34 and a fourth frame part 35 extending substantially parallel to the Y-axis. The holding frame 31 has a rectangular opening 36 surrounded by the first frame part 32, the second frame part 33, the third frame part 34, and the fourth frame part 35. The glass plate 30 is arranged in the opening 36. An outer circumferential end part of the glass plate 30 is held by the first frame part 32, the second frame part 33, the third frame part 34, and the fourth frame part 35. In this embodiment, the holding frame 31 is formed of a metal plate of stainless steel or the like.

Figure 6:
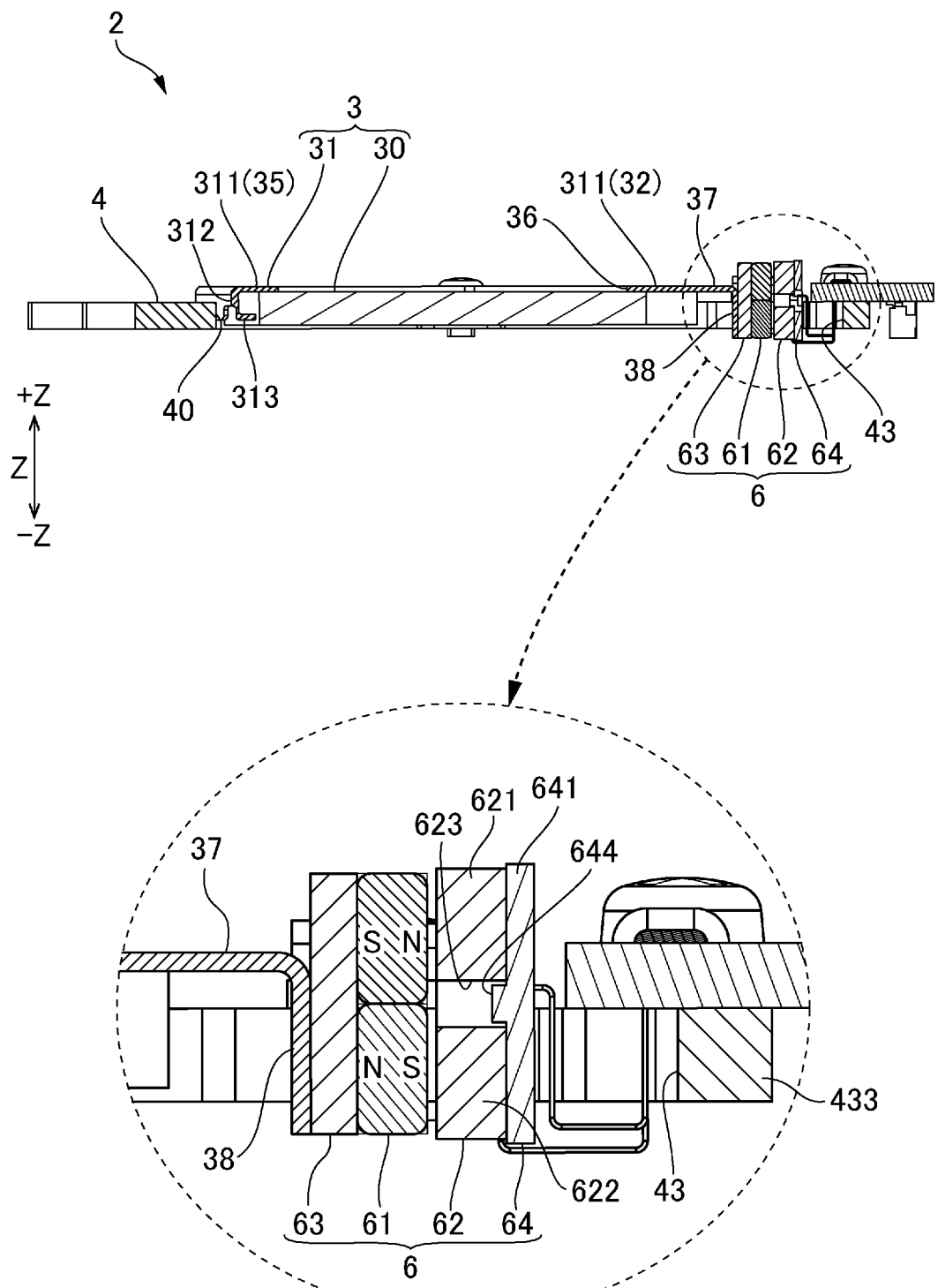
FIG. 6 shows a cross-sectional view of the optical path shifting device in FIG. 4 taken at the position of an actuator, that is, taken along A-A in FIG. 5, and a partly enlarged view thereof.
Figure 7:
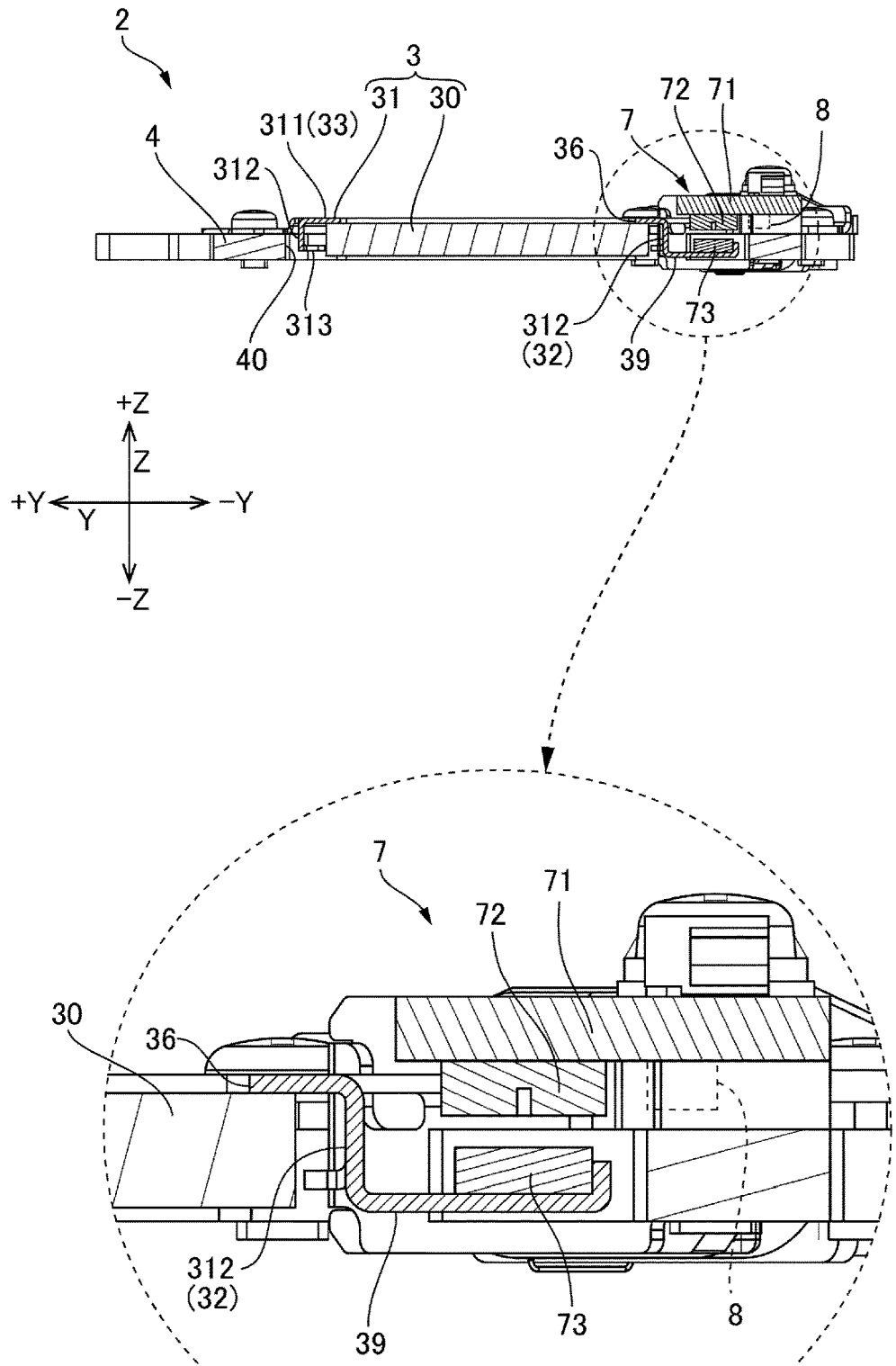
FIG. 7 shows a cross-sectional view of the optical path shifting device in FIG. 4 taken at the position of a magnetic sensor, that is, taken along B-B in FIG. 5, and a partly enlarged view thereof.

FIG. 6 shows a cross-sectional view of the optical path shifting device 2 in FIG. 4 taken at the position of the actuator 6, that is, taken along A-A in FIG. 5, and a partly enlarged view thereof. FIG. 7 shows a cross-sectional view of the optical path shifting device 2 in FIG. 4 taken at the position of the magnetic sensor 7, that is, taken along B-B in FIG. 5, and a partly enlarged view thereof. As shown in FIGS. 6 and 7, each of the first frame part 32, the second frame part 33, the third frame part 34, and the fourth frame part 35 has a front plate part 311 covering the surface on the +Z side of the outer circumferential end part of the glass plate 30, a side plate part 312 bending and extending in the −Z direction from an end part on the outer circumferential side of the front plate part 311, and a pawl part 313 protruding toward an end surface of the glass plate 30 from an end part in the −Z direction of the side plate part 312. The glass plate 30 is fixed to the holding frame 31 with an adhesive and via the pawl part 313. The holding frame 31 is a member of a bent structure formed of a bent metal plate. Therefore, the holding frame 31 can secure a required strength despite having a structure using a thin metal plate.

The glass plate 30 has a first corner part 30A and a second corner part 30B opposite each other, and a third corner part 30C and a fourth corner part 30D opposite each other in a direction intersecting a diagonal line connecting the first corner part 30A and the second corner part 30B. The first shaft part 5a and the second shaft part 5b are arranged on the diagonal line connecting the first corner part 30A and the second corner part 30B of the glass plate 30. The swing axis J passing through the first shaft part 5a and the second shaft part 5b extends in a direction along the diagonal line connecting the first corner part 30A and the second corner part 30B.

The first shaft part 5a and the second shaft part 5b are joined to the corner parts of the holding frame 31. In this embodiment, the first shaft part 5a, the second shaft part 5b, and the holding frame 31 are formed as a unified body.

The first shaft part 5a is arranged at a middle angle position between the +X direction and the +Y direction as viewed from the center of the glass plate 30. The second shaft part 5b is arranged at a middle angle position between the −X direction and the −Y direction as viewed from the center of the glass plate 30. The swing axis J passing through the first shaft part 5a and the second shaft part 5b is located within a plane substantially parallel to an XY plane and is tilted 45° from the X-axis and the Y-axis. Since the first shaft part 5a and the second shaft part 5b are arranged in point symmetry about the center of the glass plate 30, the moving part 3 has a good swing balance. Also, the tilt angle of the swing axis J from the X-axis and the Y-axis is not limited to 45°.

The support part 4 has a rectangular opening 40, where the holding frame 31 is arranged. At two corner parts on the swing axis J of an inner circumferential edge of the opening 40, a first recess part 41, where the first shaft part 5a is arranged, and a second recess part 42, where the second shaft part 5b is arranged, are provided. A distal end on the side opposite to the holding frame 31, of the first shaft part 5a, overlaps an edge of the first recess part 41 and is screwed to the support part 4. Similarly, a distal end on the side opposite to the holding frame 31, of the second shaft part 5b, overlaps an edge of the second recess part 42 and is screwed to the support part 4. The support part 4 supports the holding frame 31 in a swingable state about the swing axis J passing through the first shaft part 5a and the second shaft part 5b.

The image light LL is incident on the glass plate 30, for example, along the Z-axis. When the moving part 3 swings about the swing axis J, the angle of incidence of the image light LL on the glass plate 30 changes. As the angle of incidence of the image light LL on the glass plate 30 tilts from 0°, the incident image light LL is refracted and transmitted. Therefore, changing the attitude of the glass plate 30 in such a way as to achieve a target angle of incidence can control the direction of deflection and the amount of deflection of the image light LL. The size of such a glass plate 30 is properly set so as to transmit the image light LL emitted from the dichroic prism 110. Preferably, the glass plate 30 is substantially colorless and transparent. An antireflection coating may be formed at an image light LL incident surface and an image light LL exiting surface of the glass plate 30.

The constituent material of the glass plate 30 is not particularly limited. However, various glass materials such as white sheet glass, borosilicate glass, and quartz glass can be used. Although the glass plate 30 is used as the optical member in this embodiment, the optical member may be formed of any material that is light-transmissive and refracts the image light LL. That is, the optical member may be formed of, for example, various crystal materials such as quartz crystal and sapphire, or various resin materials such as polycarbonate-based resin and acryl-based resin, other than glass. However, using the glass plate 30 as the optical member as in this embodiment can particularly increase the rigidity of the optical member. Therefore, variation in the amount of shift of the optical path when shifting the optical path of the image light LL in the optical member can be restrained.

The holding frame 31, the support part 4, the first shaft part 5a, and the second shaft part 5b are formed of stainless steel or resin and therefore can reduce the influence of the ambient temperature. Thus, the optical path shifting device 2 which is small-sized and has a low resonance frequency can be provided. For example, the optical path shifting device 2 having a resonance frequency of approximately 60 kHz can be provided.

As shown in FIGS. 4 and 5, the actuator 6 is arranged at a position opposed to the third corner part 30C of the glass plate 30. As described above, the first shaft part 5a and the second shaft part 5b are arranged at positions opposed to the first corner part 30A and the second corner part 30B of the glass plate 30. Therefore, the actuator 6 is arranged at the most distant site from the swing axis J in the moving part 3. The actuator 6 has a permanent magnet 61 and a coil 62 opposed to each other.

As shown in FIGS. 4 and 5, the support part 4 is provided with a third recess part 43 at a position opposed to the third corner part 30C of the glass plate 30. The actuator 6 is arranged in the third recess part 43. The third recess part 43 is provided at a corner part of the opening 40 and is recessed in a direction tilted 45° from the +X direction and the −Y direction. The support part 4 has a first edge part 431, a second edge part 432, and a third edge part 433 surrounding the third recess part 43. The third edge part 433 surrounds the side opposite to the opening 40, of the third recess part 43. The first edge part 431 and the second edge part 432 extend toward the opening 40 from both ends of the third edge part 433. The first edge part 431 and the second edge part 432 extend substantially parallel to the direction tilted 45° from the +X direction and the −Y direction.

The holding frame 31 has an arm part 37 extending toward the third recess part 43 from a part on the side of the third corner part 30C, of the first frame part 32, and a drive magnet attachment part 38 provided at a distal end of the arm part 37. The arm part 37 protrudes from the first frame part 32 into the direction tilted 45° from the +X direction and the −Y direction. The drive magnet attachment part 38 bends and extends substantially at right angles into the −Z direction from the distal end of the arm part 37. The drive magnet attachment part 38 is a plate-like part extending substantially parallel to the swing axis J and the Z-axis and is greater than the arm part 37 in the width in the direction along the swing axis J.

In the actuator 6, the permanent magnet 61 is held by the holding frame 31 and the coil 62 is held by the support part 4. The actuator 6 has a magnet holding plate 63, to which the permanent magnet 61 is fixed. The magnet holding plate 63 is flat plate-shaped and fixed to the drive magnet attachment part 38. The permanent magnet 61 is fixed to the holding frame 31 via the magnet holding plate 63. The actuator 6 also has a coil holding plate 64 holding the coil 62. The coil 62 is fixed to the support part 4 via the coil holding plate 64.

Figure 8:
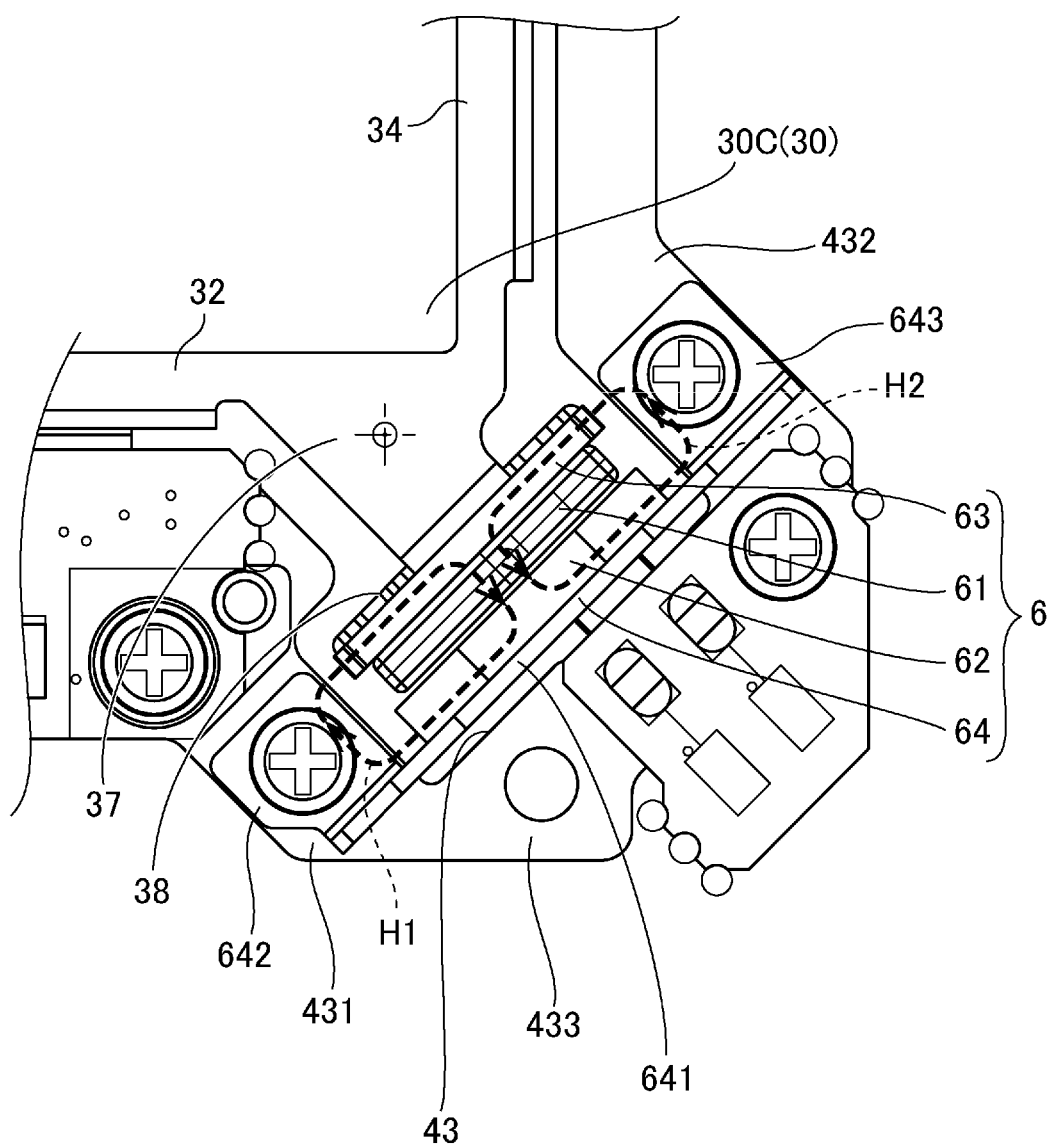
FIG. 8 is a plan view of the actuator and an enlarged view of an area C in FIG. 5.

The coil holding plate 64 has a plate-like base part 641, to which the coil 62 is fixed, and a first protruding part 642 and a second protruding part 643 protruding from the base part 641. The first protruding part 642 and the second protruding part 643 are provided on both sides of the part where the coil 62 is fixed, of the base part 641, and extend in a direction orthogonal to the surface where the coil 62 is fixed. The coil holding plate 64 is arranged at a position such that the coil 62 fixed to the base part 641 and the permanent magnet 61 fixed to the drive magnet attachment part 38 via the magnet holding plate 63 face each other with a predetermined gap. As shown in FIGS. 4, 5, and 8, on both sides of the third recess part 43, the first protruding part 642 is screwed to the first edge part 431, and the second protruding part 643 is screwed to the second edge part 432. The base part 641 is arranged in the third recess part 43 in such a way as to be substantially parallel to the drive magnet attachment part 38.

The permanent magnet 61 has a first opposing surface 610 provided with an S-pole and an N-pole. As the permanent magnet 61, for example, a neodymium magnet, samarium-cobalt magnet, ferrite magnet, alnico magnet or the like can be used. In this embodiment, the permanent magnet 61 is a neodymium magnet. The neodymium magnet can secure a necessary magnetic force despite being a small magnet and therefore can achieve a smaller size and lighter weight of the actuator 6. The coil 62 has a second opposing surface 620 opposed to the first opposing surface 610. The first opposing surface 610 and the second opposing surface 620 are parallel to each other. The term "parallel" in this case may not mean being completely parallel and allows a deviation from being completely parallel to such an extent that the functions of the actuator 6 can be achieved. The permanent magnet 61 and the coil 62 are arranged in such a way that the direction of the first opposing surface 610 and the second opposing surface 620 intersects the surface of the glass plate 30.

FIG. 8 is a plan view of the actuator and an enlarged view of an area C in FIG. 5. As shown in FIG. 8, in the actuator 6, the first protruding part 642 and the second protruding part 643 of the coil holding plate 64 are arranged on both sides of the permanent magnet 61 and the coil 62, and the permanent magnet 61 and the coil 62 are arranged in an area formed between the first protruding part 642 and the second protruding part 643. Also, the magnet holding plate 63 is arranged on the other side of the permanent magnet 61 from the coil 62, and the base part 641 is arranged on the other side of the coil 62 from the permanent magnet 61. The magnet holding plate 63 and the coil holding plate 64 are made of a metal such as iron and function as a back yoke. Therefore, closed magnetic paths H1, H2 heading from both ends of the magnet holding plate 63 toward the first protruding part 642 and the second protruding part 643 and then toward the base part 641 are formed around the permanent magnet 61 and the coil 62. This can make a magnetic flux from the permanent magnet 61 less likely to leak outside. Thus, magnetic flux leakage can be reduced and magnetic efficiency can be increased.

In this embodiment, the coil 62 is an oval air-core coil. As shown in FIG. 6, the coil 62 has two effective sides 621, 622 extending substantially parallel to the swing axis J. A center hole 623 of the coil 62 is provided between the effective sides 621, 622. At the base part 641, a protruding part 644 protruding toward the drive magnet attachment part 38 is formed by press work. The coil 62 is positioned to the base part 641 by having the protruding part 644 arranged in the center hole 623.

The permanent magnet 61 has magnetic poles formed on the first opposing surface 610 opposed to the coil 62. On the first opposing surface 610, the S-pole and the N-pole are arranged along the Z-axis. When the moving part 3 is located in the reference position, where the normal direction to the glass plate 30 is parallel to the Z-axis, that is, the angle of incidence of the image light LL on the glass plate 30 is 0°, one of the S-pole and the N-pole of the permanent magnet 61 faces the effective side 621 and the other faces the effective side 622 in the actuator 6.

When the coil 62 is electrically energized, a current flows in the opposite directions through the effective sides 621, 622. Therefore, the permanent magnet 61 moves in a direction along the second opposing surface 620. In this embodiment, the S-pole and the N-pole of the permanent magnet 61 are arrayed along the Z-axis and the effective sides 621, 622 are arranged along the Z-axis. Therefore, the actuator 6 can move the permanent magnet 61 in a direction along the Z-axis. Thus, the corner part of the holding frame 31 to which the permanent magnet 61 is fixed can be moved in a direction along the Z-axis. This causes the moving part 3 to swing about the swing axis J.

Magnetic Sensor

As shown in FIGS. 4 and 5, the magnetic sensor 7 is arranged between the actuator 6 and the second shaft part 5*b*. As shown in FIG. 7, the magnetic sensor 7 has a sensor substrate 71, a Hall sensor 72, and a magnet 73. The Hall sensor 72 is installed at the sensor substrate 71 and is fixed to the support part 4 via the sensor substrate 71. Meanwhile, the magnet 73 is fixed to the holding frame 31. The Hall sensor 72 and the magnet 73 are arranged at positions such that the distance between the magnet 73 and the Hall sensor 72 changes when the moving part 3 swings. The holding frame 31 has a sensor magnet attachment part 39 bending and extending into the −Y direction from an end part in the −Z direction of the side plate part 312 of the first frame part 32. The Hall sensor 72 fixed to the sensor substrate 71 and the magnet 73 fixed to the sensor magnet attachment part 39 face each other along the Z-axis.

The Hall sensor 72 outputs a voltage corresponding to the intensity of a magnetic field generated by the magnet 73. Therefore, the magnetic sensor 7 can measure the distance between the magnet 73 and the Hall sensor 72 in a contactless manner. In the optical path shifting device 2, the magnetic sensor 7 is arranged in such a way that the distance between the magnet 73 and the Hall sensor 72 changes when the moving part 3 swings. Therefore, based on an output from the Hall sensor 72, a displacement along the Z-axis of the holding frame 31 with the magnet 73 installed thereon can be measured in a contactless manner.

The thermistor 8 is a temperature detection unit detecting the temperature of the magnetic sensor 7. The thermistor 8 is arranged near the Hall sensor 72 and installed at the sensor substrate 71 similarly to the Hall sensor 72. Therefore, the thermistor 8 is fixed to the support part 4 via the sensor substrate 71. An output from the Hall sensor 72 and the thermistor 8 is inputted to the drive signal processing circuit 121.

Drive Control of Actuator

The optical path shifting device 2 performs an optical path shifting operation which causes the moving part 3 to swing or vibrate at a predetermined frequency, based on the drive signal DS supplied from the drive signal processing circuit 121 to the actuator 6. In the actuator 6, a current flows through the coil 62, based on the drive signal DS. This causes the moving part 3 to swing or vibrate with an amplitude and frequency corresponding to the drive signal DS. Thus, in the projector 1, the optical path of the image light LL changes with a constant amplitude and an image is displayed alternately at the image display positions P1, P2.

The drive signal processing circuit 121 controls the drive signal DS inputted to the actuator 6, based on the amplitude value of the moving part 3, that is, the holding frame 31, found from the output from the magnetic sensor 7, when performing the optical path shifting operation, and thus performs feedback control to cause the moving part 3 to vibrate with a constant amplitude. Thus, the optical path of the image light LL is changed with a constant amplitude and an image is displayed alternately at the image display positions P1, P2. In the feedback control, the amplitude value found from the output from the magnetic sensor 7 is corrected, based on the output from the thermistor 8.

Main Advantageous Effects of Embodiment

As described above, the optical path shifting device 2 in this embodiment has the glass plate 30 having a shape of a rectangular plate and on which incident light is incident, the holding frame 31 holding the glass plate 30, the support part 4 supporting the holding frame 31 in a swingable state, and the actuator 6 causing the holding frame 31 to swing. The glass plate 30 has the first corner part 30A and the second corner part 30B opposite each other, and the third corner part 30C and the fourth corner part 30D opposite each other in a direction intersecting a diagonal line connecting the first corner part 30A and the second corner part 30B. The holding frame 31 has the first shaft part 5a arranged at a position opposed to the first corner part 30A, and the second shaft part 5b arranged at a position opposed to the second corner part 30B. The holding frame 31 is connected to the support part 4 by the first shaft part 5a and the second shaft part 5b. The actuator 6 is arranged at a position opposed to the third corner part 30C.

Since the actuator 6 causing the holding frame 31 to swing is thus arranged at the third corner part 30C, a drive force can be applied to the moving part 3 from a position distant from the swing axis J. Therefore, even the actuator 6 with a small drive force can rotate the moving part 3 with a large torque. This can achieve a smaller size and lighter weight of the actuator 6 and can achieve a smaller size and lighter weight of the optical path shifting device 2.

In the embodiment, the swing axis J of the holding frame 31 extends in the direction along the diagonal line connecting the first corner part 30A and the second corner part 30B of the glass plate 30. As the swing axis J extends in the direction of the diagonal line in this manner, the distance between the actuator 6 arranged at the third corner part 30C and the swing axis J can be maximized and therefore the torque applied to the moving part 3 can be increased. Therefore, even the actuator 6 with a small drive force can rotate the moving part 3 with a large torque. This can achieve a smaller size and lighter weight of the actuator 6 and can achieve a smaller size and lighter weight of the optical path shifting device 2.

In the embodiment, the actuator 6 has the permanent magnet 61 and the coil 62 opposed to each other. The permanent magnet 61 is held by the holding frame 31. The coil 62 is held by the support part 4. Using the actuator in which the permanent magnet 61 and the coil 62 face each other and in which the coil 62 is electrically energized to move the permanent magnet 61 in this way can achieve a small-sized and simple configuration of the actuator 6. Also, since the coil 62 is provided on the fixed side instead of on the moving side, there is no need to draw a wiring around to the moving side and the wiring to the coil 62 is easily laid out.

In the embodiment, the first opposing surface 610 of the permanent magnet 61 and the second opposing surface 620 of the coil 62 face each other, and the first opposing surface 610 and the second opposing surface 620 are arranged in a direction intersecting the surface of the glass plate 30. Thus, when the holding frame 31 swings, the gap between the first opposing surface 610 and the second opposing surface 620 does not change or changes only slightly. Therefore, there is no need to provide a wide gap between the first opposing surface 610 and the second opposing surface 620 in order to avoid interference between the permanent magnet 61 and the coil 62. Since the gap between the first opposing surface 610 and the second opposing surface 620 can be reduced, the size of the permanent magnet 61 to achieve a necessary drive force can be reduced and the component cost can be lowered. For example, when an expensive magnet such as a neodymium magnet is used as the permanent magnet 61, reducing the size of the magnet can lower the component cost. Also, reducing the size of the component can achieve a smaller size and lighter weight of the actuator 6.

In the embodiment, the first opposing surface 610 and the second opposing surface 620 are parallel to each other. The actuator 6 moves the permanent magnet 61 and the coil 62 relatively to each other in a direction along the first opposing surface 610 and the second opposing surface 620, thus causing the holding frame 31 to swing. As the driving direction of the actuator 6, that is, the vibrating direction of the permanent magnet 61, is along the second opposing surface 620 in this manner, the gap between the first opposing surface 610 and the second opposing surface 620 does not change when the holding frame 31 swings. Therefore, a situation where the moving part 3 cannot move due to the coil 62 being attracted to the permanent magnet 61 when the permanent magnet 61 approaches the coil 62, can be avoided.

In the embodiment, the first opposing surface 610 and the second opposing surface 620 are parallel to the swing axis J of the holding frame 31 and tilted 45° from the X-axis and the Y-axis. The arrangement of the actuator 6 in this direction can restrain an increase in the planar size of the support part 4 as viewed from the Z-axis when the arrangement space for the actuator 6 is provided at a position opposed to the third corner part 30C. When such an arrangement is employed, the drive force of the actuator 6 does not act as a force in a twist direction to the holding frame 31. Thus, a force in the twist direction can be restrained from being applied to the glass plate 30 via the holding frame 31, and deformation of the glass plate 30 and the holding frame 31 can be restrained.

In the embodiment, the first opposing surface 610 and the second opposing surface 620 are surfaces orthogonal to the surface of the glass plate 30 and face each other in a direction orthogonal to a direction along the Z-axis, which is the normal direction to the surface of the glass plate 30. The actuator 6 moves the permanent magnet 61 and the coil 62 relatively to each other in the direction along the Z-axis, which is the normal direction to the surface of the glass plate 30. With such an arrangement, the drive force of the actuator 6 acts on the moving part 3 as a force in a direction of rotation about the swing axis J. This can increase the torque applied to the moving part 3.

In the embodiment, the actuator 6 has the coil holding plate 64 holding the coil 62, and the coil 62 is fixed to the support part 4 via the coil holding plate 64. Thus, the coil holding plate 64 functions as a back yoke. This can improve magnetic efficiency and therefore can reduce the size of the permanent magnet 61. Therefore, a smaller size and lighter weight of the actuator 6 can be achieved. Also, the component cost can be lowered. Moreover, since the magnet holding plate 63 functioning as a back yoke is arranged on the side of the permanent magnet 61 in addition to the back yoke on the side of the coil 62, magnetic efficiency can be improved further.

In the embodiment, the coil holding plate 64 has the base part 641, to which the coil 62 is fixed, and the first protruding part 642 and the second protruding part 643 protruding from the base part 641. The permanent magnet 61 is arranged in the area formed between the first protruding part 642 and the second protruding part 643. Thus, the permanent magnet 61 can be arranged in such a way as to be surrounded by the coil holding plate 64. Therefore, the closed magnetic paths H1, H2 can be formed and the magnetic flux is less likely to leak outside. The effective magnetic flux can be increased and magnetic efficiency can be increased. This can reduce the size of the permanent magnet 61 and can achieve a smaller size and lighter weight of the actuator 6.

In the embodiment, the base part 641 has the protruding part 644 protruding to the side where the coil 62 is arranged. The coil 62 is an air-core coil provided with the center hole 623, where the protruding part 644 is arranged. As the protruding part 644 of the coil holding plate 64 is thus arranged in the center hole 623 of the coil 62, the magnetic flux can be gathered in the coil 62. Therefore, magnetic efficiency can be increased and the size of the permanent magnet 61 can be reduced. This can achieve a smaller size and lighter weight of the actuator 6.

In the embodiment, the glass plate 30 is a light-transmissive substrate transmitting incident light. In the optical path shifting device 2, as the holding frame 31 swings, the angle of incidence of the incident light on the glass plate 30 is changed and this can shift the optical path of the incident light. When the optical path shifting device 2 is arranged in the optical path of the image light LL in an image display device such as the projector 1 and the actuator 6 is driven, the optical path of the image light LL, that is, the incident light, can be shifted with a constant amplitude and the position of pixels can be shifted with a constant amplitude. This increases apparent pixels and thus can achieve resolution enhancement of the image projected on the screen 101.

Modification Examples

In the embodiment, the permanent magnet 61 is held by the moving part 3 and the coil 62 is held by the support part 4. However, a configuration where the coil 62 is held by the moving part 3 and where the permanent magnet 61 is held by the support part 4 can be employed.

In the embodiment, a vibration actuator having the permanent magnet 61 and the coil 62 opposed to each other to generate a drive force based on the Lorentz force is used as the actuator 6. However, an actuator operating based on another principle may be used. For example, a piezo actuator may be employed.

What is claimed is:

1. An optical path shifting device comprising:
    an optical member having a shape of a rectangular plate and on which incident light is incident;
    a holding frame holding the optical member;
    a support part supporting the holding frame in a swingable state; and
    an actuator causing the holding frame to swing, wherein
    the optical member has a first corner part and a second corner part opposite each other, and a third corner part and a fourth corner part opposite each other in a direction intersecting a diagonal line connecting the first corner part and the second corner part,
    the holding frame has a first shaft part provided at a position opposed to the first corner part, and a second shaft part provided at a position opposed to the second corner part,
    the holding frame is connected to the support part by the first shaft part and the second shaft part, and
    the actuator is arranged at a position opposed to the third corner part.

2. The optical path shifting device according to claim 1, wherein
    a swing axis of the holding frame extends in a direction along the diagonal line.

3. The optical path shifting device according to claim 1, wherein
    the actuator has a permanent magnet and a coil opposed to each other,
    the permanent magnet is held by the holding frame, and the coil is held by the support part.

4. The optical path shifting device according to claim 3, wherein
    a first opposing surface of the permanent magnet and a second opposing surface of the coil are opposed to each other, and
    the first opposing surface and the second opposing surface are arranged in a direction intersecting a surface of the optical member.

5. The optical path shifting device according to claim 4, wherein
    the first opposing surface and the second opposing surface are parallel to each other, and
    the actuator moves the permanent magnet in a direction along the second opposing surface and thus causes the holding frame to swing.

6. The optical path shifting device according to claim 4, wherein
    the first opposing surface and the second opposing surface are parallel to a swing axis of the holding frame.

7. The optical path shifting device according to claim 3, further comprising
    a coil holding plate holding the coil, wherein
    the coil is fixed to the support part via the coil holding plate.

8. The optical path shifting device according to claim 7, wherein
    the coil holding plate has a base part to which the coil is fixed, and a first protruding part and a second protruding part protruding from the base part, and
    the permanent magnet is arranged in an area formed between the first protruding part and the second protruding part.

9. The optical path shifting device according to claim 1, wherein
    the optical member is a light-transmissive substrate transmitting the incident light, and as the holding frame swings, an angle of incidence of the incident light on the optical member is changed and an optical path of the incident light is shifted.

10. An image display device comprising:
the optical path shifting device according to claim 1, arranged in an optical path of image light, wherein
the actuator is driven to change the optical path of the image light.

* * * * *